3,792,153
METHOD FOR RECOVERING AMMONIA AND HYDROGEN CHLORIDE FROM AMMONIUM CHLORIDE

Scott Lynn, Walnut Creek, Calif., and Richard C. Forrester III, Oak Ridge, Tenn., assignors to The Regents of the University of California, Berkeley, Calif.
No Drawing. Filed Feb. 28, 1972, Ser. No. 230,082
Int. Cl. C01b 25/06
U.S. Cl. 423—319
14 Claims

ABSTRACT OF THE DISCLOSURE

Ammonia and hydrogen chloride are recovered from ammonium chloride by interaction with magnesium oxide. The magnesium oxide is not lost in the reaction, but is recycled again and again. The free ammonia and hydrogen chloride find utility in many industrial processes, e.g., the production alkali metal bicarbonates and carbonates, ion exchange regeneration and the like. To be operative in the production process, MgO must be prepared under carefully controlled conditions of temperature.

BACKGROUND OF THE INVENTION

Ammonia and hydrogen chloride are in great demand as basic reactants in many commercial chemical production processes. They find use in a broad range of processes relating to the production of both inorganic and organic materials. As such, both materials are widespread articles of the chemical industry and their production involves large amounts of plant equipment and capital investment.

Ammonia has been traditionally produced by several different processes, including the reaction of an ammonium salt with a strong base, and more importantly by the direct synthesis from nitrogen and hydrogen by catalytic reaction as in the socalled Haber process.

Hydrogen chloride, or hydrochloric acid, is prepared by burning hydrogen and chlorine, as a byproduct of many organic chemical chlorinations, from the reaction of other strong acids on salt, or from the reaction of salt, $SO_2$, air and water vapor.

In at least one large scale industrial process, i.e., the production of soda ash (sodium carbonate) large tonnages of both limestone and sodium chloride are consumed. In this process, the socalled Solvay process that has been practiced for many years, a concentrated NaCl brine is ammoniated and then carbonated to produce a sodium bicarbonate precipitate that is recovered from suitable filters. This precipitate, in turn, is calcined to produce the sodium carbonate. At the same time, limestone is calcined to provide both the process $CO_2$ requirement and lime, CaO. The CaO, in turn, is used to causticize the ammonium chloride filtrate, thereby freeing ammonia for recovery and forming $CaCl_2$.

For each ton of $NaCO_3$ produced, about a ton of $CaCl_2$, as a dilute aqueous solution, must be disposed of as waste. Attempts over the past half century, to utilize the waste $CaCl_2$ have been uniquely unsuccessful. Therefore, any new process, economically competitive, but devoid of the waste problem would be of great interest.

Similarly, a method of producing HCl and/or $NH_3$ from $NH_4Cl$ on a large economical scale without polluting wastes is of inherent interest.

BRIEF DESCRIPTION OF THE INVENTION

The invention relates to methods for producing both free ammonia and hydrogen chloride from ammonium chloride in an economic and direct manner and without the production of any useless waste products. More specifically such products are produced with the aid of a reactive magnesium oxide which is fully recyclable in the process.

It is therefore an object of the invention to produce both ammonia and hydrogen chloride from ammonium chloride without the generation of any useless waste products.

Another object of the invention is to produce a strong acid and a moderately strong base from $NH_4Cl$ by simple and direct interaction with MgO.

Another object of the invention is to produce ammonia and hydrogen chloride from ammonium chloride by interaction with MgO and wherein the MgO is continually recycled in the process.

Still another object of the invention is to provide a method for the production of sodium carbonate without the production of the useless and polluting calcium chloride byproduct.

Other objects and advantages of the invention will be understood from a review of the subsequent specification and appended claims.

DETAILED DESCRIPTION OF THE INVENTION

Although the literature indicates that MgO is a particularly unreactive material as a causticizing agent, it has been found that if properly prepared, such compound is indeed quite reactive in liberating ammonia from $NH_4Cl$. In fact, in a cyclical system, MgO can be utilized to release both $NH_3$ and HCl from $NH_4Cl$ while the magnesium salts recirculate without loss. The reactions are:

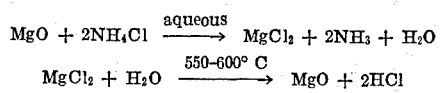

Basic magnesium chloride, MgOHCl, can also be utilized in a similar reaction sequence:

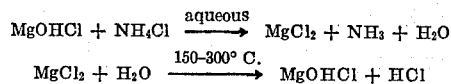

While previously believed to be unreactive for the purposes illustrated in the above equations, MgO is entirely suitable for such purposes, if it is not subjected to excessive temperatures, i.e., above about 700° C. during the reaction and recycle process.

If the temperature of hydrolysis does not exceed 300° C., MgOHCl is formed. It is still more reactive than MgO, but its use is less efficient, as indicated by the reactions above, because twice as many moles of it must be used.

Even if subjected to temperatures approaching 900° C., the MgO still exhibits some activity as a causticizing agent but the reaction becomes so slow as to be uneconomical. Therefore, for all practical purposes the MgO must never never be subjected to temperatures in excess of 700° C., and preferably not in excess of 600° C. At 600° C. and below, the MgO is suitably reactive and compares on a favorable economic basis with the traditional material, CaO.

In addition, in processes where it is desired to liberate ammonia and hydrogen chloride, e.g., the Solvay process, MgO is of even greater interest in that it is fully recyclable and yields no useless and/or polluting byproduct.

When prepared at temperatures below 600° C., MgO produces reaction rates quite comparable to CaO reaction rates in causticizing NH$_4$Cl solutions. Thus, when steam was sparged into a reactor charged with an ammonium chloride solution and stoichiometric amounts of the powdered bases, CaO or MgO, the following results were noted:

A two-minute sparge with NH$_4$Cl and CaO resulted in an NH$_3$ recovery of about 76%; while with MgO, about 65% of the NH$_3$ was recovered. With a four-minute sparge, CaO resulted in about an 86% NH$_3$ recovery; while MgO resulted in about an 82% NH$_3$ recovery. In a six-minute sparge, the NH$_3$ recovery with CaO was about a 91% recovery; with MgO about an 88% recovery.

Thus the causticizing reactivity of MgO is very closely comparable to that of CaO, the traditional reactant, especially for longer contact times. Comparison of the test conditions with typical Solvay process conditions indicate that NH$_3$ can be removed from MgO causticized strippers without a substantial increase in the required holdup or steam rates in currently used Solvay processes.

The invention reactions, per se, are known in the art, however, the literature indicates that MgO is useless, or at best a poor causticizing agent since it is considered to be relatively unreactive. However, as noted above MgO compares favorably with CaO for such purposes if it is prepared and recycled at temperatures below about 600° C.

It has been further determined that MgO is eminently suitable for use in a recycle process for separating NH$_4$Cl into the highly useful components, ammonia and hydrogen chloride. The recycle process is as follows: magnesium chloride is thermally decomposed in the presence of water to yield magnesium oxide and hydrogen chloride thus:

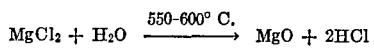

$$MgCl_2 + H_2O \xrightarrow{550-600°\,C.} MgO + 2HCl$$

The hydrogen chloride evolved from this reaction is then either utilized in further reactions, converted into hydrochloric acid, or may be oxidized to chlorine gas in the Kelchlor process or by other well known methods for the production of chlorine from hydrogen chloride.

The above reaction is most advantageously carried out at about 550° to 600° C., and in any event at a temperature of 700° C. or less. If carried out at such temperatures the magnesium oxide produced exhibits its highly reactive causticizing abilities in the reaction subsequently described.

In the second reaction of the invention the magnesium oxide yielded from the initial reaction is, in turn, used to causticize an aqueous solution of ammonium chloride to yield ammonia and magnesium chloride, i.e.:

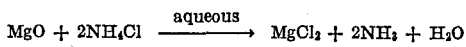

$$MgO + 2NH_4Cl \xrightarrow{aqueous} MgCl_2 + 2NH_3 + H_2O$$

The ammonia is driven off for use in subsequent chemical reactions, while the magnesium chloride is available for recycle as a reactant in the initial reaction of the invention.

It is apparent that in the practice of the two reactions above, only ammonium chloride is consumed, while the magnesium changes back and forth between the oxide and chloride without loss from the cycle. The net result is the production of ammonia and hydrogen chloride from ammonium chloride.

The invention reactions for liberating ammonia and hydrogen chloride from ammonia chloride have a number of areas of practical use. Of perhaps the greatest potential is a modified soda ash (sodium carbonate) process, commonly known as the Solvay process. In this old, widely practiced method soda ash is produced from limestone and salt in the following reactions:

(a) $NaCl + NH_3 + CO_2 + H_2O \longrightarrow NaHCO_3 + NH_4Cl$ (b) $2NaHCO_3 \xrightarrow{\Delta} Na_2CO_3 \text{ (soda ash)} + H_2O + CO_2$ (c) $CaCO_3 \xrightarrow{\Delta} CaO + CO_2$ (d) $CaO + 2NH_4Cl \longrightarrow CaCl_2 + 2NH_3 + H_2O$

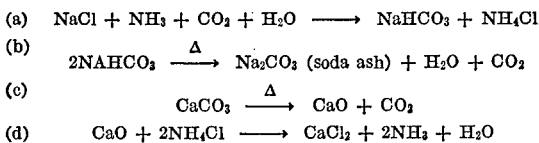

The carbon dioxide produced in reactions (b) and (c) are cycled back to reaction (a), while the ammonia produced in reaction (d) is cycled back to reaction (a) and the ammonium chloride produced in reaction (a) is cycled to reaction (d).

The net result of the Solvay process is that salt and limestone (CaCO$_3$) produce soda ash (Na$_2$CO$_3$) with calcium chloride being evolved as a waste product. Despite attempts over many years, no extensive use has been found for the waste calcium chloride, wherefore it has been dumped into the nation's streams in the amount of thousands of tons per year.

The soda ash process is advantageously modified by the reactions of the present invention whereby efficient production is achieved without the generation of a useless polluting byproduct.

The reactions in such a modified soda ash process are as follows:

(a') $NaCl + NH_3 + CO_2 + H_2O \longrightarrow NaHCO_3 + NH_4Cl$ (b') $2NaHCO_3 \xrightarrow{\Delta} Na_2CO_3 + H_2O + CO_2$ (e) $MgCl_2 + H_2O \xrightarrow{550-600°\,C.} MgO + 2HCl$ (f) $MgO + NH_4Cl \longrightarrow MgCl_2 + 2NH_3 + H_2O$

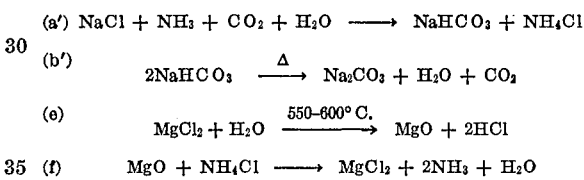

Both reactions (a') and (b') are identical with the traditional Solvay reactions as noted in reactions (a) and (b) previously discussed. However in the modified process the ammonia necessary in reaction (a) is supplied by causticizing ammonium chloride with magnesium oxide (f). At the same time magnesium chloride is produced which is cycled back to reaction (e) where the chloride is thermally decomposed in the presence of water to form the magnesium oxide and hydrogen chloride. This reaction (e) is carried out in the temperature ranges previously discussed to produce the reactive MgO of the invention.

The magnesium oxide is cycled back into reaction (f) to causticize the ammonium chloride, whereby the magnesium salts continuously circulate in the production process and no polluting byproduct is formed.

The hydrogen chloride has myriad uses in chemical industry and therefore its yield is advantageous rather than detrimental.

The carbon dioxide needed as a reactant in (a') is readily available as a combustion product of the fuel needed in the processing plant.

Calculations have shown that the modified process can be used to replace lime at a cost of about $2.00 to $5.00 per ton, of soda ash produced, and this figure compares favorably with the in-plant cost of lime in a typical Solvay process of about $5.00 to $7.00 per ton of soda.

The reactions of the invention for producing ammonia and hydrogen chloride from ammonium chloride also have utility in a number of other applications. For instance, in a dual-bed resin ion exchange process for water desalinization, which method is well known, the acid and base necessary for resin regeneration has made the cost prohibitive for large scale use. In waters in which alkali metal ions, alkaline earth ions, and chloride ions are the major contaminents, hydrochloric acid and ammonia are suitable resin regenerators.

In such a system a strong acid ion exchange resin in the hydrogen form exchanges the H$^+$ for the metallic cations and the effluent is then passed through a weak base resin in the free or OH⁻ form to exchange that ion for Cl⁻. As a consequence both the contaminating cations and anions are removed from the saline water and a pure water product is generated.

The resins upon exhaustion, must be regenerated and the hydrogen chloride and ammonia produced by the reactions of the invention are quite suitable for this purpose. The hydrogen chloride regenerates the acid resin back into the H⁺ form; while the ammonia, in the form of ammonium hydroxide, regenerates the basic resin back into the OH⁻ form. A substantially saturated solution of the removed salts forms the effluent upon regeneration. The ammonium chloride formed is thereupon converted back into ammonia and hydrogen chloride in the same sequence of steps as shown in equations (e) and (f) above.

A third major application of this invention is in the digestion of phosphate rock to form phosphoric acid. Most phosphate rock is the mineral fluorapatite,

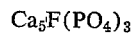

$$Ca_5F(PO_4)_3$$

Current processes digest the mineral with sulfuric acid during which process HF may be liberated, creating a severe pollution problem for the phosphate industry. By-product gypsum is formed in quantities much too large for the available market, and the digestion is relatively slow because of the formation of the insoluble gypsum.

Using the reactions of the invention hydrochloric acid can be formed for acid digestion of the mineral. The use of hydrochloric acid results in faster digestion of the rock because the calcium chloride yield is highly soluble. In addition, the high calcium ion concentration greatly reduces liberation of HF. Phosphoric acid can be readily separated from an aqueous solution of calcium chloride by well known solvent extraction methods. After separation of the phosphoric acid the calcium chloride is treated with ammonia and carbon dioxide to precipitate calcium carbonate, a byproduct of somewhat more value than gypsum. The resultant solution of ammonium chloride is then treated as before to recover HCl and NH₃. No sulfuric acid would be required.

Still another application of the invention reactions is in the removal of sulfur dioxide from stack gases. A slurry of MgO reacts readily with the SO₂, forming a slurry of the moderately soluble MgSO₃. Pure SO₂ is recovered upon the addition of HCl to the latter. The MgO and HCl are then regenerated from the resulting MgCl₂ in the manner already described. This technology would be especially appealing in sulfuric acid manufacture, where the SO₂ could simply be returned to the process stream.

Other applications of the reactions of the invention will be apparent to those skilled in chemical technology, as will modifications to the reactions herein described. All such applications and modifications are encompassed herein to the extent they fall under the claims appended below.

What is claimed is:

1. A method for producing ammonia and hydrogen chloride from ammonium chloride comprising causticizing ammonium chloride in aqueous solution with reactive magnesium oxide to yield ammonia, magnesium chloride and water; separating the ammonia from the magnesium chloride and water; thermally decomposing the magnesium chloride at temperature less than about 900° C. in the presence of water to yield hydrogen chloride and reactive magnesium oxide; separating the hydrogen chloride from the reactive magnesium oxide; and cycling the reactive magnesium oxide back into the causticizing reaction to react with additional quantities of ammonium chloride.

2. The method of claim 1 wherein the reactive magnesium oxide is prepared at temperatures at least sufficient to form the magnesium oxide and less than about 700° C.

3. The method of claim 1 wherein basic magnesium chloride is substituted for magnesium oxide.

4. A method of producing reactive magnesia wherein the magnesium oxide is prepared by hydrolyzing magnesium chloride at temperatures at least sufficient to form the reactive magnesium oxide and less than about 700° C.

5. A modified Solvay process for producing sodium carbonate comprising reacting ammonia with sodium chloride in the presence of carbon dioxide to form sodium bicarbonate and ammonium chloride; separating the sodium bicarbonate and ammonium chloride; causticizing the ammonium chloride in aqueous solution with reactive magnesium oxide to produce ammonia for recycle to the first step, and magnesium chloride; and thermally decomposing the sodium bicarbonate to sodium carbonate.

6. The method of claim 5 wherein basic magnesium chloride is substituted for magnesium oxide.

7. The method of claim 5 wherein the magnesium chloride is hydrolyzed at temperatures at least sufficient to produce reactive magnesium oxide and less than about 900° C. and hydrogen chloride; separating the hydrogen chloride from the reactive magnesium oxide; and recycling the reactive magnesium oxide back to causticize additional amounts of ammonium chloride.

8. The method of claim 7 wherein the magnesium oxide is produced and maintained at temperatures at least sufficient to form the reactive oxide and below about 700° C.

9. An efficient and nonpolluting method for producing sodium carbonate comprising the steps of reacting sodium chloride with ammonia, carbon dioxide, and water to yield sodium bicarbonate and ammonium chloride; separating the ammonium chloride from the sodium bicarbonate; causticizing the ammonium chloride in aqueous solution with reactive magnesium oxide to yield magnesium chloride and ammonia; separating the ammonia from the magnesium chloride; recycling the ammonia back to react with additional sodium chloride, carbon dioxide, and water; thermally decomposing the magnesium chloride in the presence of water at temperature at least sufficient to yield reactive magnesium oxide and less than about 700° C. and hydrogen chloride; recovering the hydrogen chloride from the reaction; recycling the reactive magnesium oxide back to causticize additional ammonium chloride; thermally decomposing the sodium bicarbonate to yield sodium carbonate, water and carbon dioxide; and separating the sodium carbonate from the water and carbon dioxide.

10. An ion-exchange method for purifying saline water and regenerating exhausted ion-exchange resins comprising passing said water through a dual-bed strong acid-weak base ion-exchange resin to exchange H⁺ for contaminating cations and OH⁻ for contaminating anions, and eluting pure water from said resins and exhausting said resins; regenerating said resins by passing hydrochloric acid and ammonium hydroxide through said resins and thereby eluting ammonium chloride from the weak base resin, causticizing the eluted ammonium chloride with reactive magnesium oxide said reactive magnesium oxide being produced by thermally decomposing magnesium chloride at temperatures less to yield ammonia and hydrogen chloride in aqueous solution, and converting the ammonia into ammonium hydroxide and the hydrogen chloride into hydrochloric acid for further use in regenerating said resins.

11. A method for producing phosphoric acid from the phosphate rock mineral fluorapatite, comprising the steps of causticizing ammonium chloride in aqueous solution with reactive magnesium oxide to yield ammonia and magnesium chloride; thermally decomposing the magnesium chloride in the presence of water at temperature less than about 900° C. to yield reactive magnesium oxide and hydrogen chloride; converting the hydrogen chloride to hydrochloric acid; recycling the reactive magnesium oxide to causticize additional ammonium chloride; digesting the phosphate rock with the hydrochloric acid to yield principally calcium chloride and phosphoric acid, separating the calcium chloride from the phosphoric acid by solvent extraction; treating the calcium chloride with ammonia and carbon dioxide to precipitate calcium carbonate from a resultant ammonium chloride solution; recycling the ammonium chloride for causticizing with reactive magnesium oxide; and recovering the phosphoric acid from the process.

12. The method of claim 9 wherein basic magnesium chloride is substituted for the reactive magnesium oxide.

13. The method of claim 10 wherein basic magnesium chloride is substituted for the reactive magnesium oxide.

14. The method of claim 11 wherein basic magnesium chloride is substituted for the reactive magnesium oxide.

References Cited

UNITED STATES PATENTS

| | | | |
|---|---|---|---|
| 2,671,713 | 3/1954 | Miller et al. | 423—356 |
| 2,823,981 | 2/1958 | Fuchsman | 423—356 |
| 3,584,997 | 6/1971 | Garry | 423—319 |

FOREIGN PATENTS

| | | | |
|---|---|---|---|
| 1,279,004 | 10/1968 | Germany | 23—193 |
| 760,524 | 10/1956 | Great Britain | 23—165 C |

EARL C. THOMAS, Primary Examiner
G. A. HELLER, Assistant Examiner

U.S. Cl. X.R.

423—356, 427, 421, 356, 481